United States Patent [19]
Polli

[11] 4,266,230
[45] May 5, 1981

[54] TIME VERIFICATION APPARATUS

[75] Inventor: Claudio Polli, Ruggell, Switzerland

[73] Assignee: Neco AG, Spielhof, Switzerland

[21] Appl. No.: 45,610

[22] Filed: Jun. 5, 1979

[51] Int. Cl.³ .............................................. G01D 9/00
[52] U.S. Cl. .................................... 346/22; 346/77 R
[58] Field of Search ................................ 346/22, 77 R

[56] References Cited

U.S. PATENT DOCUMENTS

| | | | |
|---|---|---|---|
| 2,306,770 | 12/1942 | Willhite | 346/22 |
| 2,354,934 | 8/1944 | Woodhall | 346/22 X |
| 2,621,100 | 12/1952 | Bishop | 346/22 |

*Primary Examiner*—Richard A. Wintercorn
*Attorney, Agent, or Firm*—Pascal & Associates

[57] ABSTRACT

The invention relates to a time verification apparatus for the establishment of the time of the introduction of an article into the apparatus, with a stamping mechanism driven by clockwork to print the time upon a data carrier, with a magazine having an aperture for the insertion of the article and a manually operable indexing wheel through the actuation of which the article is transported out of the zone of the aperture, the stamping mechanism is actuated and when the actuation is completed the aperture is opened for the insertion of a fresh article into the magazine.

10 Claims, 2 Drawing Figures

TIME VERIFICATION APPARATUS

BACKGROUND OF THE INVENTION

The invention relates to a time verification apparatus for the establishment of the time of the introduction of an article into the apparatus, with a stamping mechanism driven by clockwork to print the time upon a data carrier, with a magazine having an aperture for the insertion of the article and a manually operable indexing wheel through the actuation of which the article is transported out of the zone of the aperture, the stamping mechanism is actuated and when the actuation is completed the aperture is opened for the insertion of a fresh article into the magazine.

Time verification apparatus of this kind find an application in carrier pigeon competitions for example as so-called carrier pigeon clocks. On the arrival of a pigeon the pigeon identity ring is removed from the pigeon, fed into a compartment of a magazine and simultaneously the time of insertion is established on a data carrier by a printing stamp. Verifier apparatus of this kind also finds an application in other competitive sports however, for example to establish a time of arrival at the finish after handing over by the competition of an identity mark.

In the case of such time verification apparatus the circumstances are such that a plurality of articles, such as identity rings for instance, can be inserted into the magazine one after another. In the case of carrier pigeon clocks the magazine has to have more than twenty compartments for the reception of more than twenty identity rings. One important condition is thereby apparent, that the magazine cannot be manipulated, for instance through removal of identity rings from the magazine and/or through the introduction of identity rings into the magazine in the wrong order, in order to attain the result that a printed timing is associated with an identity ring to be found in a given compartment that does not agree.

Time verification apparatus are known which have a drum magazine in which a plurality of chambers is arranged. The principal disadvantage of such drum magazines is that the drum magazine must be made of a size corresponding to the maximum possible number of verifications. Thus the maximum possible space which is available for the drum magazine restricts the maximum possible number of verifications. A further disadvantage is the relatively complicated mechanism of drum magazines of this type.

The problem exists so to constitute the time verification apparatus that a large number of falsification-proof verifications is possible without a multiplicity of moving parts and without a great space requirement.

SUMMARY OF THE INVENTION

With a time verification apparatus of the kind mentioned initially, this problem is solved in accordance with the invention through the fact that the indexing wheel is kinematically connected to a rotatable driver, which with its rotation effected through the indexing wheel conveys a container located under the aperture for the reception of the article into one end of a storage channel, through which all other containers in the storage channel are pushed one stage further on and in this way the container located at the other end of the storage channel is pushed into the conveying zone of the driver, which when further rotated transports this latter container under the aperture.

The number of the possible verifications is determined by the length of the channel or through the number of containers which can be accommodated therein. The insertion and transporting mechanism consists only of a single part, namely the rotatable driver.

It is possible in a simple manner to arrnge the indexing wheel and the driver on the same indexing shaft. The driver is preferably a disc that is rotatable in the zone of the two ends of the storage channel and possesses a recess, the width of which is greater than the width of the container. Through this recess a container is transported at all times from the other end of the storage channel to beneath the aperture. After insertion of an article into this container through the aperture, with further turning of the indexing wheel this container is conveyed to one end of the storage channel, by way of a linking channel which joins the two ends of the storage channel. The driver is rotatable in this linking channel. Preferably the two ends of the storage channel run parallel beside one another in a direction towards the driver.

The edges of the above-mentioned recess run substantially radially to the axis of rotation of the driver. It is however possible for the leading edge of the recess, along which the container standing at the other end of the storage channel slides when it is pushed into the zone of the driver, to be curved in the direction of the rotational movement of the driver. In order to ensure that the driving of this container is as smooth and free from play as possible, the axis of the other end of the storage channel can run rather in the direction of the axis of rotation of the driver. The course of the storage channel can be as desired. Preferably however the storage channel runs externally around the driver and the linking channel.

In order to obtain a tilt-free driving action, the driver disc preferably runs at the mid-height of the channel.

An additional safety factor is provided through the fact that the indexing wheel is rotated over the zone of the aperture in the magazine and is provided with an aperture which concides with the aperture in the magazine when a container is in position under the aperture of the magazine. For security reasons the indexing wheel has a reversing lock, so that at all times the container can only be conveyed in one direction of rotation by the driver.

BRIEF INTRODUCTION TO THE DRAWINGS

One form of embodiment of the invention is illustrated in the drawings. It shows:

in FIG. 1 a plan view of the apparatus, and in FIG. 2 a section along the line II—II in FIG. 1.

DETAILED DESCRIPTION OF THE INVENTION

Figure 2:
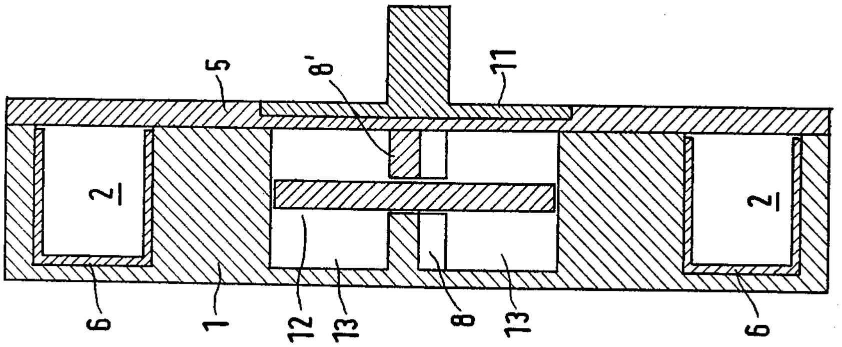
Figure 1:
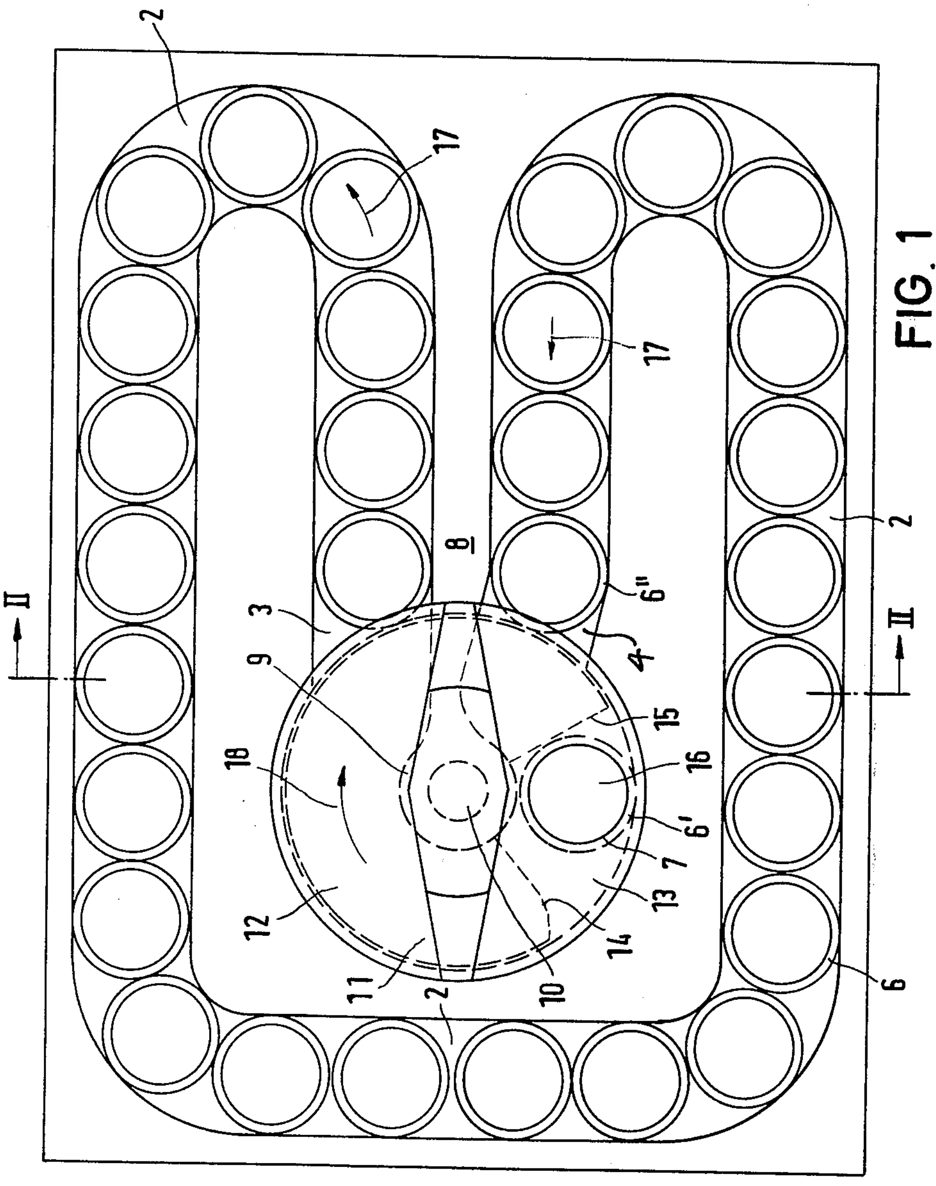

A storage channel 2 is let into a magazine block 1. This storage channel runs substantially in the front of a U, with the free terminal limbs curved U-shaped inwards and there forming two storage channel ends 3, 4. The entire magazine block 1 and with it also the channel 2 are enclosed by a cover 5. This cover 5 is joined to the magazine block 2 in such a way that the containers 6 located in the channel 5 are inaccessible.

The cover 5 has a single aperture 7, the diameter of which is roughly equal to the inside diameter of the container 6.

The ridge 8 which separates the two channel ends 3, 4 from one another is extended beyond the channel ends 3, 4 and forms a bearing boss 9 for an indexing shaft 10. A manually operated indexing wheel 11 and a driver 12 are connected to this indexing shaft 10.

An annular linking channel 13 is provided between the two channel ends 3, 4, inside which the driver 12 is turned. The driver 12 is located at the mid-height of the linking channel 13. For this purpose, the cover 5 has a ridged port 8', which coincides with the extension of the ridge 8 and is disposed above the driver 12.

The driver 12 is provided with a recess, having a leading guiding edge 14 and a trailing driving edge 15. These two recess edges 14, 15 run substantially radial to the axis of the indexing shaft 10. The leading guiding edge 14 is however curved slightly in the direction of rotation 16 of the driver at the outer side.

The storage channel end 3 runs roughly tangentially and the other storage channel end 4 roughly radially relative to the indexing shaft 10.

The indexing wheel 11 is provided with an aperture 16 which is the same size as the aperture 7 of the cover 5, so that in the position of the indexing wheel 11 shown the two apertures 7 and 16 coincide.

The time verification apparatus functions in the following manner:

In the position shown a container 6' is positioned in the linking channel 13 under the concident apertures 7 and 16. If an article is deposited in the container 6', the indexing wheel 11 is then turned manually in the direction of rotation 18, and the driving edge 15 of the recess in the drive disc 12 carries the container 6' through the linking channel 13 in the direction of rotation 18. With this rotational movement the stamping mechanism, which is not shown, is actuated, so that the time is printed on a data carrier. After a rotational travel of about 270° the container 6' is pushed into the end 3 of the storage channel, and this container 6' thus pushes all the containers 6 in the channel 2 further on. This is indicated by the arrows 17. Through this the container 6'' standing at the other end 4 of the storage channel is pushed along the guiding edge 14 into the zone of the linking channel 13 and hence taken up by the driving edge 15 and transported under the aperture 7. The aperture 7, which previously was covered by the indexing wheel 11, is now again accessible, since the aperture 16 of the indexing wheel 11 is again coincident with the aperture 7 of the cover 5. In this way a next article can be deposited in the container 6'', which is now located beneath the apertures 7, 16. A new working cycle is thus possible.

I claim:

1. A time verification apparatus useful for operating a time stamping mechanism upon introduction of an article into the apparatus, comprising a magazine having an aperture for receiving an article, a storage channel in the magazine, a plurality of moveable, similary shaped containers each having an article receiving opening, stored in the storage channel, a rotatable driver for receiving the containers one at a time from one end of the storage channel in a conveying zone, retaining each container in the conveying zone with the opening adjacent said aperture and for delivering each container to the other end of the storage channel as the driver is rotated, whereby a container located adjacent the aperture for the reception of the article is conveyed into said other end of the storage channel, pushing the other containers in the storage channel along the storage channel and pushing a container located at said one end of the storage channel into the conveying zone of the driver which, when further rotated transports the latter container adjacent the aperture; and further including a manually operable indexing wheel kinetically linked with the rotatable driver for rotating said driver and for operating said time stamping mechanism.

2. Apparatus as defined in claim 1, in which the indexing wheel and the driver are connected together on the same indexing shaft.

3. Apparatus as defined in claim 1, in which the ends of the storage channel are located at the conveying zone, the driver consisting of a disc which is rotatable in said zone and having a recess the width of which is greater than the width of a container.

4. Apparatus as defined in claim 1, in which portions of the storage channel adjacent its ends run parallel beside one another in a direction towards the driver and the two storage channel ends are joined via a linking channel, in which the driver is rotatable.

5. Apparatus as defined in claim 3, in which the edges of the recess run substantially radially to the axis of rotation of the driver, the leading edge of the recess, along which the container standing at said one end of the storage channel slides when it is pushed into the zone of the driver, being curved at the outside in the direction of rotation of the driver.

6. Apparatus as defined in claim 4 or 5, in which the axis of said one end of the storage channel runs approximately in a direction towards the axis of rotation of the driver.

7. Apparatus as defined in claim 4, in which the storage channel runs around the outside of the driver and the linking channel.

8. Apparatus as defined in claim 3, in which the axis of the disc is at mid-height of the channel.

9. Apparatus as defined in claim 2, in which the indexing wheel is rotatable over the zone of the aperture in the magazine and includes an aperture which coincides with the aperture in the magazine when a container is located beneath the aperture in the magazine.

10. Apparatus as defined in claim 1, in which the indexing wheel includes a reversing lock.

* * * * *